US012756994B2

(12) United States Patent
Kim et al.

(10) Patent No.: US 12,756,994 B2
(45) Date of Patent: Oct. 6, 2026

(54) METHOD AND APPARATUS FOR CONFIGURING OFFLOADING POLICY FOR VPLMN EDGE SERVICE IN MOBILE COMMUNICATION SYSTEM

(71) Applicant: Samsung Electronics Co., Ltd., Suwon-si (KR)

(72) Inventors: Hyesung Kim, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 299 days.

(21) Appl. No.: 18/397,731

(22) Filed: Dec. 27, 2023

(65) Prior Publication Data

US 2024/0224009 A1 Jul. 4, 2024

(30) Foreign Application Priority Data

Dec. 30, 2022 (KR) ........................ 10-2022-0191209

(51) Int. Cl.

| | |
|---|---|
| ***H04W 4/24*** | (2024.01) |
| ***H04W 8/20*** | (2009.01) |
| ***H04W 48/18*** | (2009.01) |
| *H04W 84/04* | (2009.01) |

(52) U.S. Cl.

CPC ............... *H04W 4/24* (2013.01); *H04W 8/20* (2013.01); *H04W 48/18* (2013.01); *H04W 84/042* (2013.01)

(58) Field of Classification Search

CPC ......... H04W 4/24; H04W 8/20; H04W 48/18; H04W 84/042

See application file for complete search history.

(56) References Cited

U.S. PATENT DOCUMENTS

| | | | |
|---|---|---|---|
| 2020/0260525 | A1 | 8/2020 | Gan et al. |
| 2023/0116405 | A1 | 4/2023 | Lee et al. |
| 2023/0132454 | A1 | 5/2023 | Kim et al. |

FOREIGN PATENT DOCUMENTS

| | | | | |
|---|---|---|---|---|
| EP | 4354828 A1 * | 4/2024 | ......... | H04L 61/4541 |
| KR | 10-2023-0050048 A | 4/2023 | | |
| KR | 10-2023-0061128 A | 5/2023 | | |
| WO | WO-2024134597 A1 * | 6/2024 | ............ | H04W 76/10 |

OTHER PUBLICATIONS

ETSI TS 123 502 V17.4.0, 5G; Procedures for the 5G System (5GS) (3GPP TS 23.502 version 17.4.0 Release 17); May 2022; pp. 214-215, 466, 516.*

International Search Report and Written Opinion of the International Searching Authority dated Apr. 16, 2024, in connection with International Application No. PCT/KR2023/021468, 7 pages.

(Continued)

*Primary Examiner* — Jackie Zuniga Abad

(57) ABSTRACT

The disclosure relates to a 5G or 6G communication system for supporting a higher data transmission rate. Specifically, disclosed is a method and apparatus for efficiently configuring and applying a policy associated with a roaming user equipment (UE) when an edge computing service is provided via a HR session or an LBO session.

20 Claims, 7 Drawing Sheets

(56) References Cited

OTHER PUBLICATIONS

Ericsson, "Notification for SM Policy Association Establishment/ Termination Events," C4-216249 was C4-215535, 3GPP TSG-CT WG4 Meeting #107-e, E-Meeting, Nov. 15-23, 2021, 57 pages.
Huawei, et al., "KI#1: Update Evaluation and Conclusion for HR case," S2-2208563 (revision of S2-220xxxx), 3GPP TSG-WG SA2 Meeting #153E e-meeting, Oct. 10-17, 2022, 5 pages.
Nokia, et al., "5GC Support of HR PDU Session traffic offloading towards VPLMN EHE," S2-2210286 (revision of S2-221), SA WG2 Meeting #154, Toulouse, France, Nov. 14-18, 2022, 19 pages.
Samsung, et al., "KI#1, Conclusion and Evaluation Update for HR Scenarios," S2-2209887 (revision of S2-2208978), 3GPP TSG-WG SA2 Meeting #153e, E-meeting, Oct. Oct. 17, 2022, 6 pages.
Samsung, "The procedure for HR PDU Session for supporting Session Breakout in VPLMN," S2-2210731, 3GPP TSG-WG SA2 Meeting #154, Toulouse, France, Nov. 14-18, 2022, 7 pages.
Supplementary European Search Report dated Sep. 29, 2025, in connection with European Application No. 23912829.1, 10 pages.
3GPP TS 23.548 V18.0.0 (Dec. 2022), Technical Specification, 3rd Generation Partnership Project; Technical Specification Group Services and System Aspects; 56 System Enhancement for Edge Computing; Stage (Release 18), Dec. 2022, 60 pages.
3GPP TR 23.700-48 V2.0.0 (Nov. 2022), Technical Report, 3rd Generation Partnership Project; Technical Specification Group Services and System Aspects; 56 System Enhancement for Edge Computing; Phase 2 (Release 18), Nov. 2022, 196 pages.

* cited by examiner

METHOD AND APPARATUS FOR CONFIGURING OFFLOADING POLICY FOR VPLMN EDGE SERVICE IN MOBILE COMMUNICATION SYSTEM

CROSS-REFERENCE TO RELATED APPLICATION

This application is based on and claims priority under 35 U.S.C. § 119 to Korean Patent Application No. 10-2022-0191209, filed on Dec. 30, 2022, in the Korean Intellectual Property Office, the disclosure of which is herein incorporated by reference in its entirety.

BACKGROUND

1. Field

The disclosure relates to a mobile communication system (or a radio communication system) and, more particularly, to a method and apparatus for configuring a policy in order to provide edge computing service information in a mobile communication system.

2. Description of Related Art $5^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

With the development of communication systems, a demand for smooth provision of an edge service to a roaming user equipment (UE) has been increased.

The above information is presented as background information only to assist with an understanding of the disclosure. No determination has been made, and no assertion is made, as to whether any of the above might be applicable as prior art with regard to the disclosure.

SUMMARY

In order to use an edge computing service via a home routed (HR) session, a roaming user equipment (UE) may make a breakout of the corresponding session into a local data network (or a local access part of a data network) in which an edge computing server of a visited network is installed.

In the case of the HR session, a method of interoperating with a home public land mobile network (HPLMN) and applying a roaming offloading policy (e.g., quality of service (QoS) and usage amount monitoring and the like) associated with a breakout session that diverges without intervention of a policy control function (PCF) or a visited public land mobile network (VPLMN) is not defined. Configuring a policy to control QoS and usage amount monitoring and the like associated with a breakout session may be essential to control a network resource for providing a service to a roaming UE and a normal subscriber UE.

In addition, even when a roaming UE uses an edge computing service via a local break out (LBO) session, the roaming UE makes a breakout of an LBO session and accesses a local data network (or a local access part of a data network). In this instance, it is needed to configure a roaming offloading policy associated with a breakout session and to control QoS and usage amount monitoring associated with the corresponding session.

Therefore, the disclosure provides a method of efficiently configuring and applying a policy associated with a session of a roaming UE. Specifically, there are provided methods of configuring a policy to support a roaming service via a HR session and an LBO session. In addition, the disclosure provides a method in association with a process in which a network entity (e.g., a session management function (SMF) entity) of a visited network obtains a roaming offloading policy and a process in which a PCF of a visited network or a home network produces/allows/corrects a session management policy for the corresponding HR session.

According to an embodiment of the disclosure, a method performed by a first SMF entity of a home public land mobile network (HPLMN) is provided. The method comprises: transmitting, to a policy control function (PCF) entity of the HPLMN, a first message for requesting an offloading policy for a visited public land mobile network (VPLMN), the first message including information indicating that a protocol data unit (PDU) session of the VPLMN supports a home routed session breakout (HR-SBO); and receiving, from the PCF entity of the HPLMN, a second message as a response to the first message, the second message including the offloading policy for the VPLMN based on the information.

According to an embodiment of the disclosure, a method performed by a PCF entity in a mobile communication system, the method comprising: receiving, from a first SMF entity of a HPLMN, a first message for requesting an offloading policy for a VPLMN, the first message including information indicating that a PDU session of the VPLMN supports HR-SBO; and transmitting, to the first SMF entity of the HPLMN, a second message as a response to the first message, the second message including the offloading policy for the VPLMN based on the information.

According to an embodiment of the disclosure, a first SMF entity is provided. The first SMF entity comprises: a transceiver; and a controller coupled with the transceiver and configured to: transmit, to a PCF entity of the HPLMN, a first message for requesting an offloading policy for a VPLMN, the first message including information indicating that a PDU session of the VPLMN supports a HR-SBO, and receive, from the PCF entity of the HPLMN, a second message as a response to the first message, the second message including the offloading policy for the VPLMN based on the information.

According to an embodiment of the disclosure, a PCF entity is provided. The PCF entity comprises: a transceiver; and a controller coupled with the transceiver and configured to: receive, from a first SMF entity of a HPLMN, a first message for requesting an offloading policy for a VPLMN, the first message including information indicating that a PDU session of the VPLMN supports a HR-SBO, and transmit, to the first SMF entity of the HPLMN, a second message as a response to the first message, the second message including the offloading policy for the VPLMN based on the information.

According to various embodiments of the disclosure, a process of configuring and applying a roaming offloading policy needed for providing an edge computing service to a roaming UE may be efficiently performed. In addition, network resources respectively provided to the service of a normal UE and the service of a roaming UE may be dynamically and efficiently controlled via a roaming offloading policy.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
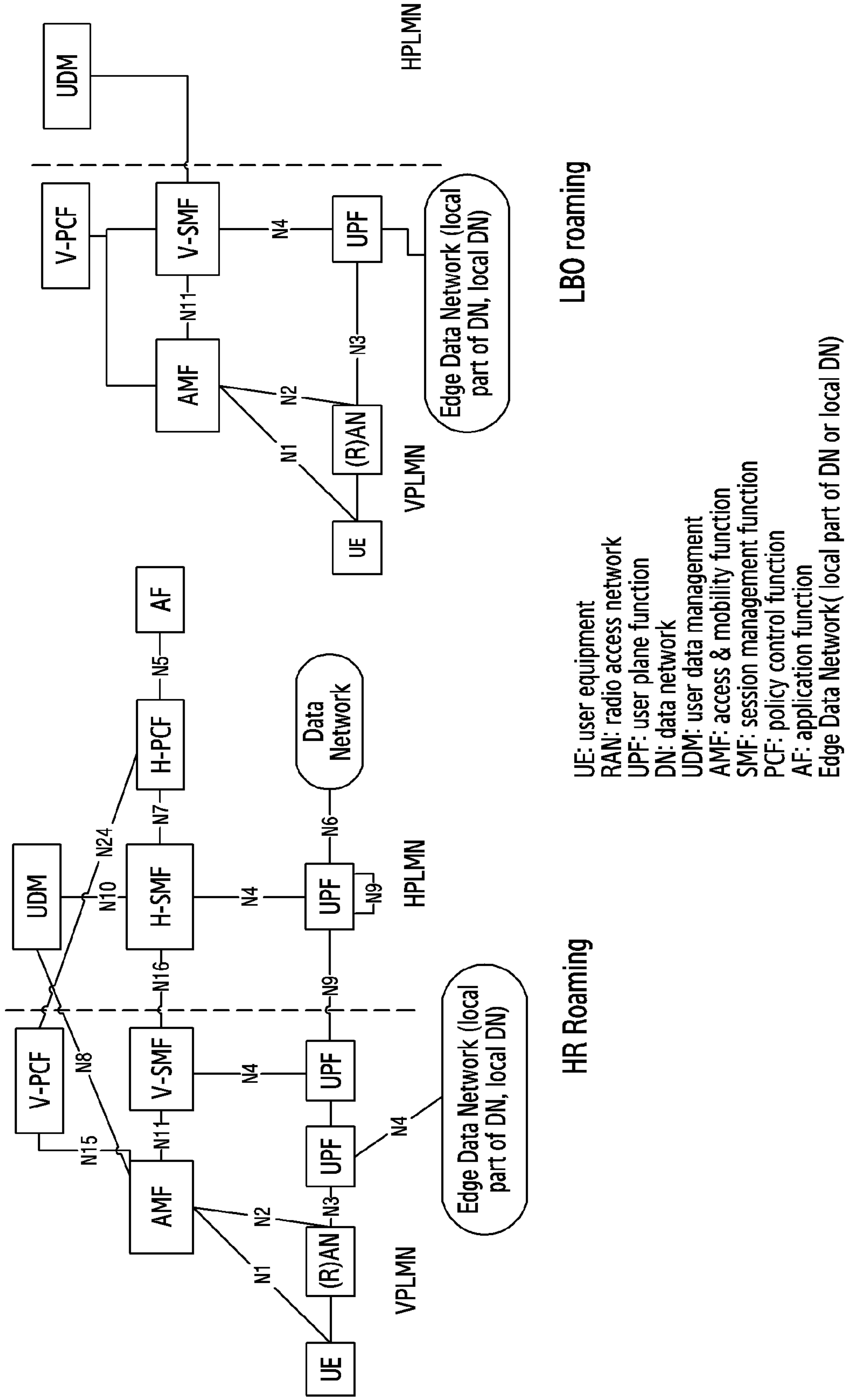
FIG. 1 illustrates a roaming scenario of a user equipment (UE) according to embodiment of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, exemplary embodiments of the disclosure will be described in detail with reference to the accompanying drawings. It should be noted that, in the drawings, the same or like elements are designated by the same or like reference signs as much as possible. Furthermore, a detailed description of known functions or configurations that may make the subject matter of the disclosure unclear will be omitted.

In describing the embodiments, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card. Furthermore, the "unit" in the embodiments may include one or more processors.

In the following description, terms for identifying access nodes, terms referring to network entities, terms referring to messages, terms referring to interfaces between network entities, terms referring to various identification information, and the like are illustratively used for the sake of descriptive convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) or new radio (NR) standards for the sake of descriptive convenience. However, the disclosure is not limited by these terms and names, and may be applied in the same way to systems that conform other standards.

In the following description, a base station (BS) is an entity that allocates resources to terminals, and may be at least one of a radio access network (RAN) node, a gNode B (next generation node B, gNB), an eNode B (evolved node B, eNB), a Node B, a wireless access unit, a base station controller, and a node on a network. In the disclosure, the term "eNB" may be interchangeably used with the term "gNB." That is, a base station described as "eNB" may indicate "gNB."

In the following description, a terminal may include a user equipment (UE), a mobile station (MS), a cellular phone, a smartphone, a computer, or a multimedia system capable of performing communication functions. Of course, examples of the base station and the terminal are not limited thereto.

In the disclosure, terms referring to network entities, network functions (NFs), network nodes, and edge computing system entities, terms referring to messages, terms referring to identification information, and the like are illustratively used for the sake of descriptive convenience. Therefore, the disclosure is not limited by the terms as used below, and other terms referring to subjects having equivalent technical meanings may be used. For example, in the following description, the term "terminal" may refer to an MAC entity in each terminal that exists for each of a master cell group (MCG) and a secondary cell group (SCG).

In particular, the disclosure may be applied to 3GPP NR (5th generation mobile communication standards). In addition, the disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology. The term "terminal" may refer to mobile phones, NB-IOT devices, sensors, and other wireless communication devices.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) (or a mobile station (MS)) transmits data or control signals to a base station (BS) (eNode B), and the downlink indicates a radio link through which the base station transmits data or control signals to the UE. The above multiple access scheme separates data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

According to an embodiment, eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IOT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time such as 10 to 15 years because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and also may require a design for assigning a large number of resources in a frequency band in order to secure reliability of a communication link.

The above-described three services considered in the 5G communication system, that is, eMBB, URLLC, and mMTC, may be multiplexed and transmitted in a single system. In order to satisfy different requirements of the respective services, different transmission/reception techniques and transmission/reception parameters may be used between the services. However, the above mMTC, URLLC, and eMBB are merely examples of different types of services, and service types to which the disclosure is applied are not limited to the above examples.

In the following description of embodiments of the disclosure, the LTE, LTE-A, LTE Pro, 5G (or NR), or 6G system will be described by way of example, but the embodiments of the disclosure may be applied to other communication systems having similar backgrounds or channel types. Furthermore, based on determinations by those skilled in the art, the embodiments of the disclosure may be applied to other communication systems through some modifications without significantly departing from the scope of the disclosure.

In the following description of the disclosure, terms and names defined in the 5G system standards are used for the sake of descriptive convenience. However, the disclosure is not limited by these terms and names, and may be applied in the same way to systems that conform other standards.

FIG. 1 illustrates a roaming scenario of a user equipment (UE) according to embodiments of the present disclosure. FIG. 1 is a diagram illustrating an example among edge computing implementation scenarios configured in the disclosure and, particularly, an example of an edge computing scenario without distinguishing layers.

A 5G system structure that supports home routed (HR) roaming may include various network functions (NF), and FIG. 1 illustrates an access and mobility management function (AMF), a session management function (SMF), a policy control function (PCF), an application function (AF), a unified data management (UDM), a data network (DN), a user plane function (UPF), a (radio) access network ((R) AN), and a user equipment (UE) among the various functions.

Each NF may support the following functions:

An AMF provides an access and mobility management function based on a UE unit, and a single AMF may be basically accessed by a single UE. A visited-AMF (V-AMF) is an AMF of a visited network from the perspective of a UE subscriber. A home-AMF (H-AMF) is an AMF of a home network of a UE subscriber;

A DN may be, for example, an operator service, an Internet access or 3rd party service, or the like. The DN transmits a downlink protocol data unit (PDU) to a UPF, or receives, from the UPF, a PDU transmitted from a UE;

A PCF receives information associated with a packet flow from an application server, and provides a function of determining a policy associated with mobility management, session management, and the like. Particularly, the PCF may support functions such as supporting a unified policy framework to control network operations, providing a policy rule so that a control plane function(s) (e.g., an AMF, an SMF, and the like) implements the policy rule, implementing a front end for accessing related subscription information for determining a policy in a unified data repository (UDR);

An SMF may provide a session management function, and in the case in which a UE has multiple sessions, the sessions may be respectively managed by SMFs different from each other. A V-SMF is an SMF of a visited network from the perspective of a UE subscriber. A H-SMF is an SMF of a home network of a UE subscriber;

A UDM stores user subscription data, policy data, and the like;

A UPF transfers a downlink PDU received from a DN to a UE via a (R)AN, and transfer an uplink PDU received from a UE to a DN via a (R)AN; And/or An AF interoperates with a 3GPP core network in order to provide a service (e.g., supporting functions such as application effect on traffic routing, accessing network capability exposure, interoperating with a policy framework for policy control, or the like).

A network function or network entities illustrated in FIG. 1 may be some of the nodes included in a 5G core network, and the 5G core network may include a larger number of network functions or network entities than the example.

Figure 2:
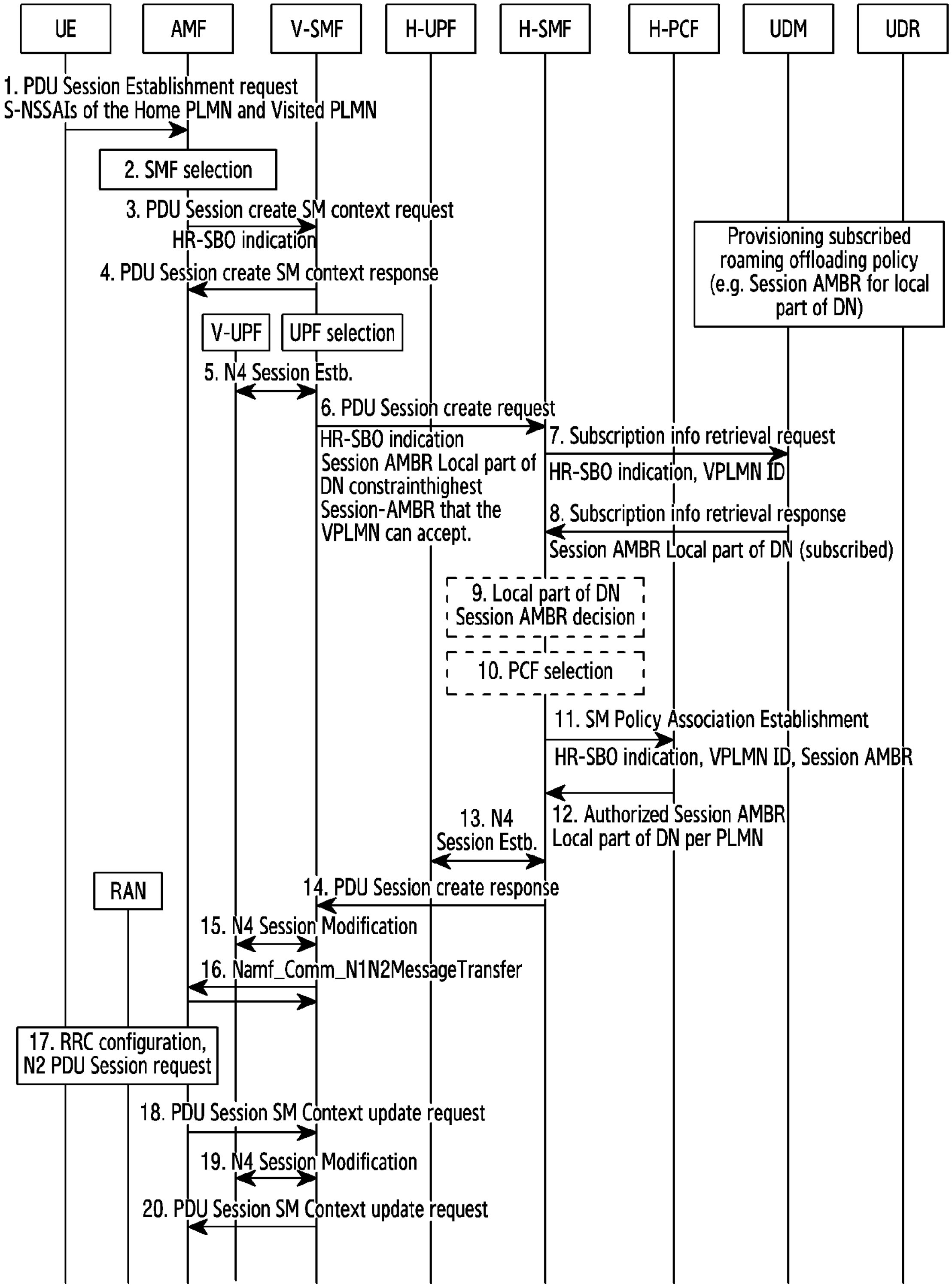
FIG. 2 illustrates a process of configuring and applying a roaming offloading policy according to an embodiment of the present disclosure.

FIG. 2 illustrates a process of configuring and applying a roaming offloading policy according to an embodiment of the present disclosure. FIG. 2 is a diagram illustrating an embodiment of a process of producing and applying a roaming offloading policy for an edge computing service.

A series of procedures illustrated in FIG. 2 is merely an example for embodying a provided embodiment. That is, at least one operation among the operations illustrated in FIG. 2 may be omitted when the provided process according to an embodiment is embodied.

In one example of Operation 1, a UE transmits a message for requesting PDU session establishment to an AMF. The message for requesting PDU session establishment transmitted by the UE may include at least one of a UE identifier, a PDU session identifier, a HPLMN single-network slice selection assistance information (HPLMN S-NSSAI), VPLMN S-NSSAI, or data network name (DNN) information, and the UE may provide the information to an AMF.

In one example of Operation 2, before receiving a PDU session establishment request from the UE (e.g., while performing a UE registration procedure), the AMF (i.e., an AMF of a VPLMN) may receive information associated with whether a session breakout of a HR roaming session is supported or allowed from a UDM of a HPLMN. Based on the same, in case that HR session breakout (HR-SBO) is available in association with the corresponding UE and a PDU session requested by the corresponding UE (or a DNN or S-NSSAI associated with session establishment requested by a UE), the AMF may select a V-SMF supporting the same when selecting an SMF.

In one example of Operation 3, the AMF may transmit the information received from the UE and an HR session breakout indication to the selected V-SMF, and a PDU session establishment SM context request message may be used for such transmission. The HR session breakout (HR-SBO) indication may be used for informing that HR session breakout is allowed or supported.

In one example of Operation 4, the V-SMF may transmit a response message to the AMF in response to operation 3. The V-SMF may determine whether to perform HR session breakout according to local configuration. For example, the V-SMF may determine whether to perform HR session breakout in consideration of a network resource situation, a network situation or the like, and an operator policy or the like. The V-SMF may determine whether to perform HR session breakout, and include information indicating a result associated with whether to perform HR session breakout in a response message transmitted to the AMF.

In one example of Operation 5, the V-SMF may select a V-UPF and establish an N4 session so as to configure an UP path connectable to a HPLMN, and the configuration process may be performed via a process of transmitting and receiving an N4 session establishment request/response message. In case that HR session breakout is allowed in operation 4, the V-SMF may configure a user plane (UP) path capable of functions as an uplink classifier (ULCL) or branching point (BP).

In one example of Operation 6, the V-SMF may transmit, to an H-SMF, a PDU session create request message including the information received from the AMF. In case that the V-SMF receives an HR session breakout indication from the AMF and determines to perform HR session breakout in the previous operation, the V-SMF may transmit an HR-SBO indication to the H-SMF. In case that the V-SMF receives the HR session breakout indication from the AMF, the V-SMF may provide, to the H-SMF, an aggregate maximum bitrate (AMBR) value (e.g., a HR-SBO session AMBR, an AMBR for a session to a local part of a DN, or a highest session AMBR for a local part of a DN, or a local session AMBR) applicable to a breakout session that breaks out of a HR in the VPLMN. The V-SMF may transmit, to the H-SMF, the HR session breakout-dedicated AMBR value together with a session AMBR value for the entire HR session (the maximum session AMBR value allowable in the VPLMN), HR session breakout allow VPLMN edge deployment information (fully qualified domain name (FQDN)(s)), EAS IP ranges, a data network name (DNN), S-NSSAI, and DN access identifier ((DNAI)(s)). In addition, the PDU session establishment request message may include information needed for producing a roaming offload policy (e.g., HR session breakout allow application information and HR session breakout allow FQDN information) in addition to a UE identifier, an S-NSSAI, a DNN, and an AMBR for a session of a local part of a DN.

In one example of Operation 7, the H-SMF may provide, to a UDM, the UE identifier, a VPLMN ID associated with roaming performed by the UE, the HR session breakout indication, the DNN, the S-NSSAI, and the like and may request subscriber information of the roaming UE, and this process may be performed via transmission of a subscriber information retrieval request message. Based on the information received from the V-SMF, the H-SMF may proceed with establishing a session and identifying of a roaming offloading policy to be applied to a session. For example, in case that the H-SMF receives a HR session breakout indication from the V-SMF, the H-SMF may determine whether HR session breakout is allowed and a roaming offloading policy (e.g., QoS and monitoring, a charging related policy, HR session breakout allow application information, HR session breakout allow FQDN information, and the like), and the like in consideration of subscription information, a business policy configured in the H-SMF, and the like.

In one example of Operation 8, the UDM may provide whether HR session breakout is allowed to the H-SMF, and may provide HR session breakout authorization information or indication, and may provide UE related subscriber information and a roaming offloading policy. The process may be performed via a process of transmitting a response message to the request message in operation 7 (depending on the case, information stored in a UDR may be retrieved and provided). For example, in association with the UE that performs requesting and the PDU session (or DNN and S-NSSAI), the UDM may transmit, to the H-SMF, whether HR session breakout is allowed in association with the VPLMN ID to which roaming is being performed and an AMBR associated with a breakout session that breaks out of the HR (e.g., an AMBR for a subscribed session of a local part of a DN or an AMBR value for a subscribed session of a local part of a DN). In addition, the UDM may provide, to the H-SMF, HR roaming session breakout related monitoring, a charging related policy, HR session breakout allow application information, HR session breakout allow FQDN information, HR session breakout allow IP address range, and the like, as a roaming offloading policy.

In the case of the UDM and UDR, whether HR roaming session breakout is allowed and a roaming offloading policy may be configured for each VPLMN ID. In addition, whether the HR roaming session breakout is allowed and roaming offloading policy information may be configured to be different for each DNN and S-NSSAI. For example, information associated with whether HR roaming session breakout is allowed and a roaming offloading policy may be configured for each combination of a PLMN ID, a DNN, and an S-NSSAI. The roaming offloading policy may include values, such as an AMBR for a subscribed session of a local part of a DN, a subscribed data traffic volume threshold for a local part of a DN, and the like.

In one example of Operation 9, based on HR session breakout authorization information or indication associated with the corresponding VPLMN obtained from the UDM, the H-SMF may determine that HR session breakout is allowed and may determine related policy information. For example, the H-SMF may determine an AMBR for a session of a local part of a DN that is to be actually applied by taking into consideration the AMBR for a session of a local part of a DN supportable in the VPLMN that is received from the V-SMF and the AMBR for the subscribed session of a local part of a DN obtained from the UDM. In addition, determination may be made in association with HR session breakout allow application information, HR session breakout allow FQDN information, a HR session breakout allow IP address range, and the like. The H-SMF may directly make determination in case that a H-PCF is not used.

In one example of Operation 10, the H-SMF may select a H-PCF capable of providing HR session breakout related policy information or roaming offloading policy information of the roaming UE.

In one example of Operation 11, the H-SMF may transmit, to the H-PCF, HR session breakout allow information/indication, a VPLMN ID, a DNN/S-NSSAI, and policy related information (an AMBR for a session of a local part of a DN, VPLMN edge deployment information, and the like) obtained from the UDM and V-SMF, and may request HR session breakout related policy or roaming offloading policy information.

In one example of Operation 12, the H-PCF may respectively provide session policies (roaming offloading polices or the like) to be applied to the VPLMN and the HPLMN by taking into consideration the information received from the H-SMF (the VPLMN ID, QOS information or the like such as the AMBR for session of a local part of a DN provided by the V-SMF, and the AMBR for a subscribed session of a local part of a DN provided from the H-SMF) and related information obtained from the UDR (e.g., with respect to each of the HPLMN and the VPLMN, information associated with a charging function address, a charging method, a subscriber category, usage amount monitoring information, a usage amount monitoring key, monitoring start and end dates, a traffic volume limit, a traffic usage time limit and the like may be stored in the UDR, and the H-PCF may use the VPLMN ID received from the H-SMF and may obtain roaming session related policy related information to be applied to the VPLMN and policy related information to be applied to the HPLMN.) For example, as a roaming offloading policy, the H-PCH may provide, to the H-SMF, an authorized AMBR for a session of a local part of a DN, a HR session breakout related monitoring policy, HR session breakout allow application information, HR session breakout allow FQDN information, and the like. The H-PCF may distinguish the information as information mapped to the VPLMN ID such as an SM policy association ID, and information to be applied to the HPLMN, and may provide the same to the H-SMF (the authorized AMBR for a session of a local part of a DN AMBR, HR session allow application and FQDN information, and the like may be mapped to the VPLMN ID and may be provided). In addition, the H-PCF may provide, to the H-SMF, charging information (e.g., a charging key, a charging function ID, a charging function address, an application service provider ID, a charging method (e.g., an online or offline scheme), a measurement scheme (a data volume, a duration, a combined volume/duration and the like)) and usage amount monitoring information (e.g., a monitoring key, a volume threshold, a time threshold, a monitoring time), AF influenced traffic steering enforcement control information, and the like, which is different for each of the HPLMN and VPLMN, by mapping the same to each PLMN ID (i.e., by identifying based on a PLMN ID). A policy control request trigger associated therewith may also be defined for each PLMN and may be provided.

In one example of Operation 13, the H-SMF may select a H-UPF based on the information received from the H-PCF and the information received from the V-SMF, and may configure, for the H-UPF, a policy (a policy mapped to the HPLMN ID among policies received in the previous operation) to be applied to the HPLMN. The process may be performed by establishing an N4 session between the H-SMF and the H-UPF. For example, the H-SMF may configure, for the H-UPF, the session AMBR for the entire HR, and the H-UPF may monitor and apply a session AMBR for a DL.

In one example of Operation 14, the H-SMF may transmit, to the V-SMF, HR session related roaming offloading policy information received from the H-PCF, and this process may be performed by transmitting a PDU session create request message. In case that the H-PCF does not intervene, the H-SMF may provide the roaming offloading policy determined based on the information obtained from the V-SMF and the UDM in operation 9. The information that the H-SMF transmits to the V-SMF may include at least one piece of information among the following items:

- HR session breakout authorization information (information/indication indicating that it is allowed or whether it is allowed is included);
- An AMBR for a session of a local part of a DN (in case that information provided by the H-PCF or information determined by the H-SMF and information provided by the H-PCF are present, a value provided by the H-PCF is preferentially used) (for reference: provided only when HR session breakout is allowed);
- A session AMBR;
- HR session breakout allow application information (application identifier or IP address information, IP address range information);
- HR session breakout allow FQDN information, an IP address range (for reference: provided only when HR session breakout is allowed); and/or
- Monitoring and charging related information: information to be applied to a breakout HR session (for reference: provided only when HR session breakout is allowed) and information to be applied to the entire HR session are distinguished and provided as two types of policy information (e.g., a charging key, a charging function ID, a charging function address, an application service provider ID, a charging method (e.g., an online or offline scheme), a measurement scheme (a data volume, a duration, a combined volume/duration, and the like), a monitoring key, a volume threshold, a time threshold, a monitoring time, and the like).
- A UE IP address (IPv4 or IPv6 address information)

In one example of Operation 15, the V-SMF may determine, based on the information received from the H-SMF, whether HR session breakout is allowed, may update the information configured for the V-UPF in operation 5, and this process may be performed via, for example, transmission or reception of an N4 session correct request/response message. For example, in case that the HR session breakout is identified, based on the HR session breakout authorization information provided by the H-SMF, as being allowed, a UPF that functions as an uplink classifier (ULCL) or a branch point (BP) may be selected, and a roaming offloading policy related to a local part of a DN that is received from the H-SMF (e.g., an AMBR for a session of a local part of a DN) and a policy to be applied to the entire HR session (e.g., a session AMBR) may be configured.

In one example of Operation 16, the V-SMF may transmit, to the AMF, the policy information that needs to be configured for the UE and the RAN. For example, information associated with a QoS rule, a UE IP address, a session AMBR, and an AMBR for a session of a local part of a DN may be provided.

In one example of Operation 17, the AMF may transmit, to the RAN and the UE, a PDU session identifier, a PDU session establishment allow message, a session AMBR, an AMBR for a session of a local part of a DN, a QoS rule(s), QoS flow level QoS parameters, a UE IP address (IPv4), and the like. Based on the information received from the AMF, the UE and the RAN may perform RRC configuration, and may apply a session AMBR policy in an uplink by using the AMBR value for a session of a local part of a DN and the session AMBR value.

In one example of Operation 18, the AMF may provide, to the V-SMF, user plane resource setup information configured in the RAN.

In one example of Operation 19, the V-SMF may configure, for the V-UPF, a connection with the RAN.

In one example of Operation 20, the V-SMF may transmit a response message to the AMF in response to operation 18.

After completing the procedures described with reference to FIG. 2 or while performing the procedures, the V-SMF may add, based on the information received from the H-SMF, a UPF that acts as an uplink classifier or a branch point, and may configure a UP path for supporting an edge service. The operation will be described in detail with reference to FIG. 3 provided below.

Figure 3:
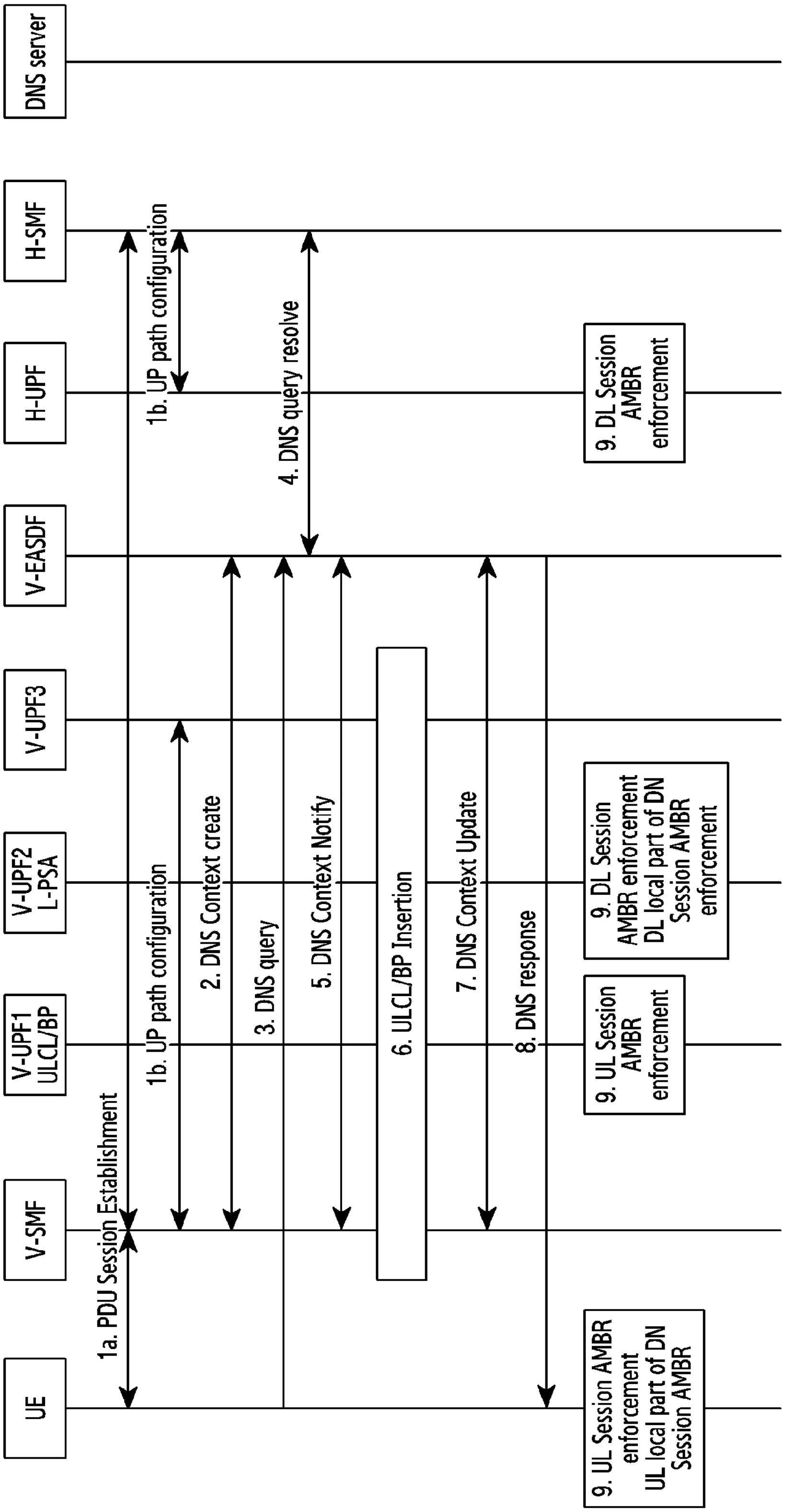
FIG. 3 illustrates a process of configuring a user plane path based on a roaming offloading policy for an edge computing service according to an embodiment of the present disclosure.

FIG. 3 illustrates a process of configuring a user plane path based on a roaming offloading policy for an edge computing service according to an embodiment of the present disclosure. FIG. 3 describes a process of configuring an UP path based on an edge computing service roaming offloading policy.

In one example of Operation 1a, a UE, a V-SMF, and a H-SMF may interoperate and may establish (or set up) a PDU session for HR roaming.

In one example of Operation 1b, the V-SMF and H-SMF may configure V-UPF3 and a H-UPF that connect a VPLMN and a HPLMN, respectively. The H-SMF may configure, for the H-UPF, a session AMBR (i.e., a DL session AMBR) associated with the entire HR session. In addition, the H-SMF may transmit the configuration information to the V-SMF, so as to configure a session AMBR with respect to a the UE, a UPF (e.g., V-UPF2) that functions as a PDU session anchor (PSA) in the VPLMN, and a UPF (e.g., V-UPF1) that functions as a uplink classifier or branch point. In addition, in case that an AMBR for a session of a local part of a DN is configured, the H-SMF may transmit the AMBR for a session of a local part of a DN to the V-SMF, so as to configure the AMBR for a session of a local part of a DN with respect to the UE and an RAN, and a UPF (e.g., V-UPF1 that functions as a uplink classifier or branch point and V-UPF2 that functions as a PSA of a local part of a DN) that may be added.

In one example of Operation 2, the V-SMF may configure domain name system (DNS) query message handling rule information in a visited edge application server discovery function (V-EASDF), and this process may be performed via transmission of a DNS context create message. The DNS query message handling rule information may include a UE address, a DNN/S-NSSAI, DNS message detection and action information (FQDN ranges, EAS IP ranges, ECS option, local DNS service IP address), and the like.

In one example of Operation 3, the UE may transmit a DNS query to the V-EASDF received from the V-SMF.

In one example of Operation 4, the V-EASDF may interoperate with a DNS server and may obtain an EAS address in response to the DNS query message from the UE.

In one example of Operation 5, the V-EASDF may transmit, to the V-SMF, a DNS context notification including the obtained EAS address.

In one example of Operation 6. the V-SMF may perform ULCL/BP insertion in consideration of the EAS address received from the V-EASDF. In this instance, the V-SMF may select V-UPF2 and may configure the same as a local PDU session anchor (L-PSA), and the V-SMF may configure, for V-UPF2, the policy received from the H-SMF. For example, the V-SMF may configure, for V-UPF2, the session AMBR associated with the entire HR roaming session that is received from the H-SMF, and the roaming offloading policy such as an AMBR for a session of a local part of a DN, a usage amount monitoring rule, a usage amount threshold, and the like. In addition, the V-SMF may select V-UPF1 and may configure the same as an uplink classifier or branch point. In addition, the V-SMF may configure, for V-UPF1 that is configured as a ULCL or branch point, the session AMBR (UL session AMBR) associated with the entire HR roaming session that is received from the H-SMF, so that V-UPF1 may operate according to the configuration.

In one example of Operation 7, the V-SMF may provide the DNS message handling rule to an EASDF, and the EASDF may provide a guidance associated with processing a DNS query of the UE. The process may be performed according to a DNS context update process.

In one example of Operation 8, the V-EASDF may transmit a DNS response including EAS address information to the UE according to the DNS message handling rule provided by the V-SMF.

In one example of Operation 9, the UE, together with the RAN, may apply both the UL session AMBR and the AMBR for a UL session of a local part of a DN that is received from the V-SMF (provided by the H-SMF and received via the V-SMF). The UE may apply the UL session AMBR with respect to the traffic of the entire HR roaming session and may apply the AMBR for a UL session of a local part of a DN to the traffic transmitted to a local part of a DN of the VPLMN. To apply the AMBR for a UL session of a local part of a DN, the UE may distinguish traffic transmitted to a local part of a DN by using target traffic information (5 tuple or an application identifier or an application client identifier) or IPv6 prefix or the like, and may apply the AMBR for a session of a local part of a DN.

V-UPF1 that acts as an uplink classifier or branch point may perform UL session AMBR enforcement configured by the V-SMF, and may perform usage amount monitoring with respect to a local part of a DN and the entire HR session.

V-UPF 2 that acts as a PSA for a local part of a DN may perform enforcement of a DL session AMBR configured by the V-SMF and an AMBR for a DL session of a local part of a DN, and may perform usage amount monitoring with respect to a local part of DN.

In addition, the H-UPF may perform DL session AMBR enforcement and usage amount monitoring with respect to a HR roaming session configured by the H-SMF.

An operation in which the H-SMF in the procedures of FIG. 2 and FIG. 3 provides roaming offloading policy information included in subscriber information via interoperation with the UDM and provides, to a H-PCF, policy information allowable in the VPLMN that is obtained from the V-SMF, and an operation of obtaining a finally authorized roaming offloading policy from the H-PCF may be performed while a PDU session is established or may be performed in a PDU session correction procedure after the PDU session is established.

In addition, the H-SMF may obtain edge deployment information in the VPLMN from the V-SMF in order to produce a roaming offloading policy to be applied in the VPLMN, the information may be configured in advance in the H-SMF, or the information may be obtained via a H-NEF. In addition, the H-SMF may determine a roaming offloading policy based on autonomously configured information without interoperation with the H-PCF, and may provide the same to the V-SMF. For example, in a network in which the H-PCF is not used, the H-SMF may configure a roaming offloading policy based on the UDM or autonomously configured information.

Figure 4:
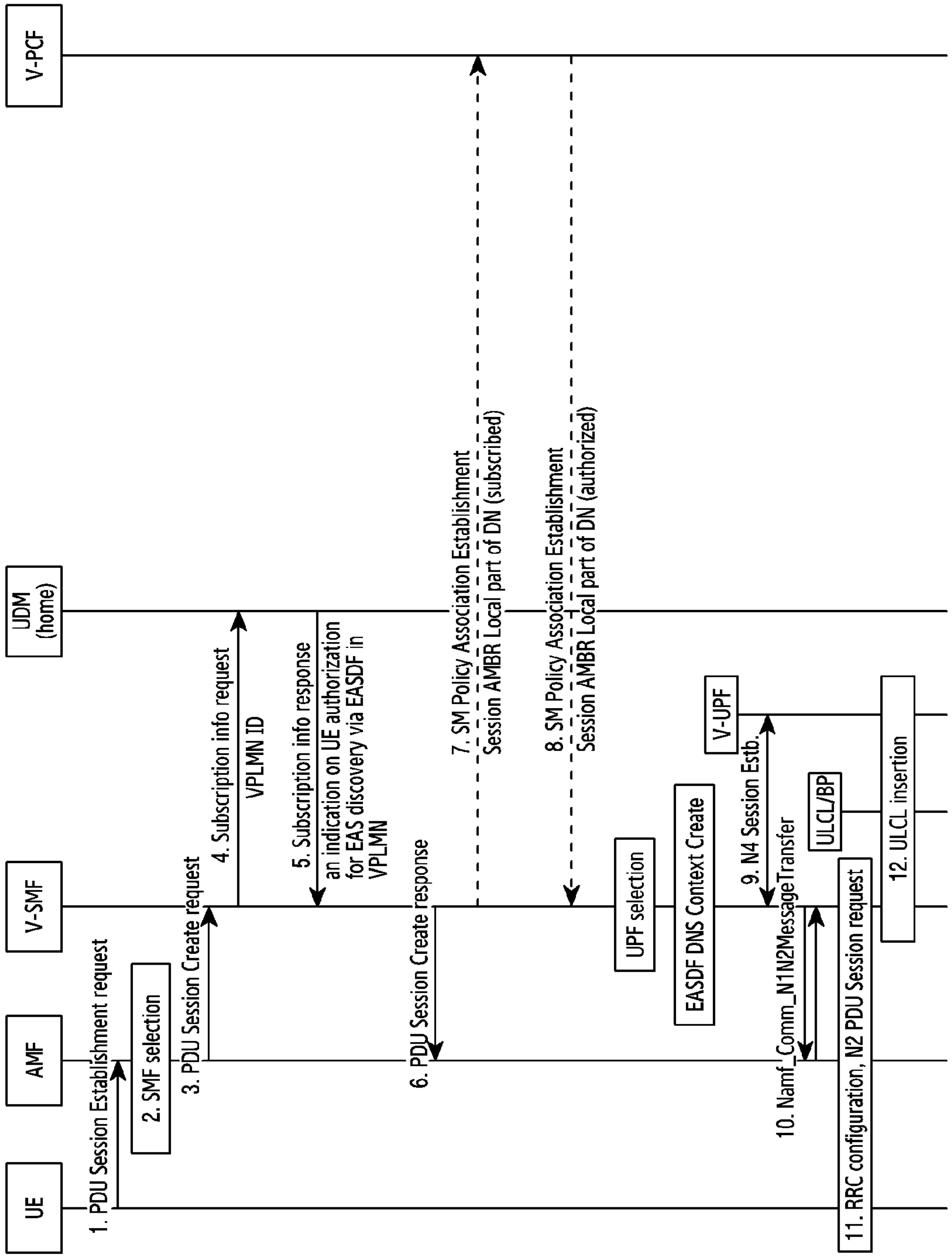
FIG. 4 illustrates a process of configuring and applying a roaming offloading policy according to another embodiment of the present disclosure.

FIG. 4 illustrates a process of configuring and applying a roaming offloading policy according to another embodiment of the present disclosure.

In one example of Operation 1, a UE transmits a message for requesting PDU session establishment to an AMF. The message for requesting PDU session establishment transmitted by the UE may include at least one of a UE identifier, a PDU session identifier, a single-network slice selection assistance information (HPLMN S-NSSAI), VPLMN S-NSSAI, or a data network name (DNN), and the UE may provide the information to an AMF.

In one example of Operation 2, the AMF (i.e., an AMF of a VPLMN) may select a V-SMF (e.g., a V-SMF capable of performing local breakout associated with a roaming UE, that is, LBO session or a V-SMF capable of configuring an UPF that functions as a ULCL or BP with respect to an LBO and an LBO session) capable of performing session management of the corresponding UE and a PDU session requested by the corresponding UE (or a DNN or S-NSSAI associated with session establishment requested by a UE).

In one example of Operation 3, the AMF may transmit, to the selected V-SMF, information received from the UE and information indicating that establishment of an LBO session is allowed, and a PDU session creation (or establishment) SM context request message may be used for such transmission.

In one example of Operation 4, the V-SMF may provide, to a UDM, a UE identifier, a VPLMN ID associated with roaming performed by the UE, a DNN, an S-NSSAI, and the like and may request subscriber information of the roaming UE, and the process may be performed via transmission of a subscriber information retrieval request message. Based on the information received from the AMF, the V-SMF may proceed with establishing a session and identifying a roaming offloading policy to be applied to a session.

In one example of Operation 5, the UDM may provide, to the V-SMF, information associated with whether LBO is allowed and may provide UE related subscriber information associated with VPLMN roaming and a roaming offloading policy associated with the corresponding PDU session (or associated with a DNN and S-NSSAI), and this process may be performed via transmission of a response message in response to the request message in operation 4 (e.g., the UDM may retrieve information stored in a UDR and may provide the same to the V-SMF). For example, in association with the UE that performs requesting and the PDU session (or a DNN and S-NSSAI), the UDM may transmit, to the V-SMF, whether LBO is allowed in association with a VPLMN ID to which roaming is being performed and an AMBR associated with a breakout session that breaks out of an LBO session (e.g., a subscribed session AMBR for a local part of a DN or an AMBR value for a subscribed session of a local part of a DN). In addition, the UDM may provide, to the V-SMF, usage amount monitoring of a session of a local part of a DN of the LBO roaming session, a charging related policy of a local part of a DN of the LBO roaming session, application information that allows breakout of the LBO roaming session into a local part of a DN, FQDN information that allows breakout of the LBO roaming session into a local part of a DN, an IP address range that allows breakout of the LBO roaming session into a local part of a DN, and the like, as a roaming offloading policy. The session of a local part of a DN of the LBO roaming session may be a breakout session that breaks out of the LBO roaming session via the UPF that functions as an uplink classifier or branch point for supporting an edge computing service of the VPLMN. With respect to the UDM and UDR, LBO allow information and a roaming offloading policy may be configured for each VPLMN ID. In addition, whether the LBO is allowed and roaming offloading policy information may be configured to be different for each DNN and S-NSSAI.

In one example of Operation 6, the V-SMF may transmit a PDU session establishment response message to the AMF in response to operation 3.

In one example of Operation 7, the V-SMF may select a V-PCF capable of providing LBO session related policy information or roaming offloading policy information of the roaming UE. For example, the V-PCF may be selected using a HPLMN ID of the UE, a DNN, and an S-NSSAI. The V-SMF may transmit, to the selected V-PCF, LBO session allow information/indication, a HPLMN ID, a DNN/S-NSSAI, and policy-related information obtained from the UDM, and may request the LBO session related policy or roaming offloading policy information.

In one example of Operation 8, the V-PCF may respectively provide, to the V-SMF, session policies (roaming offloading policies or the like) to be applied to the VPLMN and HPLMN in consideration of information received from the V-SMF (an HPLMN ID, QOS information such as an AMBR for a session of a local part of a DN that is provided by the V-SMF, and the like, and an AMBR for a subscribed session of a local part of a DN that is provided by the V-SMF) and related information obtained from the UDR [e.g., a charging function address, a charging method, a subscriber category, usage amount monitoring information of a session of a local part of a DN of the LBO roaming session (a usage amount monitoring key, monitoring start and end dates, a traffic volume limit, a traffic usage time limit, and the like), a charging related policy of a local part of a DN of the LBO roaming session, application information that allows breakout of the LBO roaming session into a local part of a DN, FQDN information that allows breakout of the LBO roaming session into a local part of a DN, an IP address range that allows breakout of the LBO roaming session into a local part of a DN]. For example, as the roaming offloading policy, the V-PCF may provide, to the V-SMF, an authorized AMBR for a session of a local part of a DN, an LBO session breakout related monitoring policy, application information that allows a session of a local part of a DN of the LBO roaming session, FQDN information that allows a session of a local part of a DN of the LBO roaming session, and the like. The V-PCF may distinguish the information as policy information associated with a normal LBO session such as an SM policy association ID and information to be applied to a session of a local part of a DN of the LBO roaming session (by using DNAI or an indicator of a session of a local part of a DN, or the like), and may provide the same to the V-SMF (an authorized AMBR for a session of a local part of a DN, application and FQDN information that allows a session of a local part of a DN of the LBO roaming session and the like may be mapped to the DNAI or the indicator for a session of a local part of a DN and may be provided). In addition, the V-PCF may provide, to the V-SMF, charging information [a charging key, a charging function ID, a charging function address, an application service provider ID, a charging method (an online or offline scheme), a measurement scheme (a data volume, a duration, a combined volume/duration, and the like)], usage amount monitoring information [a monitoring key, a volume threshold, a time threshold, and a monitoring time], AF influenced traffic steering enforcement control information, and the like, different for each of a normal LBO session and a session of a local part of a DN of the LBO roaming session. A policy control request trigger associated therewith may also be defined for each of the normal LBO session and a session of a local part of a DN of the LBO roaming session, and may be provided.

In one example of Operation 9, based on the information received from the V-PCF, the V-SMF may select a V-EASDF and configure a DNS context, and may select a V-UPF and may configure a roaming offloading policy. The operation of configuring the V-UPF may be performed via an N4 session establishment procedure. The information that the V-SMF transmits to the V-UPF may include at least one piece of information among the following items:

An AMBR for a local part of a DN;

A session AMBR;

Application information that allows a session of a local part of a DN of an LBO roaming session (an application identifier or IP address information, IP address range information);

FQDN information that allows a session of a local part of a DN of an LBO roaming session, an IP address range (for reference: provided only when HR session breakout is allowed);

Monitoring and charging related information: information to be applied to a breakout LBO session that and information to be applied to the entire LBO session may be distinguished and may be provided as two types of policy information. [For example, a charging key, a charging function ID, a charging function address, an application service provider ID, a charging method (an online or offline scheme), a measurement scheme (a data volume, a duration, a combined volume/duration and the like), a monitoring key, a volume threshold, a time threshold, and a monitoring time]; and UE IP address (IPv4 or IPv6 address information).

In one example of Operation 10, the V-SMF may transmit, to the AMF, policy information that needs to be configured for the UE and an RAN. For example, the V-SMF may provide, to the AMF, information associated with a QoS rule, a UE IP address, a session AMBR, and an AMBR for a session of a local part of a DN.

In one example of Operation 11, the AMF may transmit, to the RAN and the UE, a PDU session identifier, a PDU session establishment allow message, a session AMBR, an AMBR for a session of a local part of a DN, a QoS rule(s), QoS flow level QoS parameters, a UE IP address (IPv4), and the like. Based on the information received from the AMF, the UE and the RAN may perform RRC configuration, and may enforce a session AMBR policy in an uplink by using an AMBR value for a session of a local part of a DN and a session AMBR value. The AMF may provide, to the V-SMF, user plane resource setup information configured in the RAN.

In one example of Operation 12, the V-SMF may add a UPF that functions as an uplink classifier or branch point, and may connect to the V-UPF. A session path may be configured in which transmission to a local part of a DN is performed via the UPF that functions as an uplink classifier or branchpoint. The V-SMF may configure, for the UPF that functions as an uplink classifier or branchpoint, a session AMBR with respect to the entire LBO roaming session that is received from the V-PCF and the following information as a roaming offloading policy such as an AMBR for a session of a local part of a DN, a usage amount monitoring rule, a usage amount threshold, and the like:

An AMBR of a local part of a DN (in case that information provided by a H-PCF or information determined by a H-SMF, and information provided by the H-PCF are present, a value provided by the H-PCF is preferentially used) (for reference: provided only when HR session breakout is allowed);

Session AMBR;

Application information that allows a session of a local part of a DN of an LBO roaming session (an application identifier or IP address information, IP address range information);

FQDN information that allows a session of a local part of a DN of an LBO roaming session, an IP address range (for reference: provided only when HR session breakout is allowed); and/or Monitoring and charging related information: information to be applied to a breakout LBO session and information to be applied to the entire LBO session may be distinguished and may be provided as two types of policy information. [For example, a charging key, a charging function ID, a charging function address, an application service provider ID, a charging method (an online or offline scheme), a measurement scheme (a data volume, a duration, a combined volume/duration and the like), a monitoring key, a volume threshold, a time threshold, and a monitoring time].

For reference: the UPF that functions as an uplink classifier or a branchpoint may also function as a PDU session anchor for a local part of a DN. In addition, instead of the UPF that functions as an uplink classifier or branchpoint, a separate V-UPF may be configured and may be used as a PDU session anchor for a local part of a DN. In this instance, for the UPF that functions as a PDU session anchor with respect to a local part of a DN, the V-SMF may configure a roaming offloading policy related to a session for a local part of a DN that is configured for the UPF that functions as an uplink classifier or branchpoint.

Figure 5:
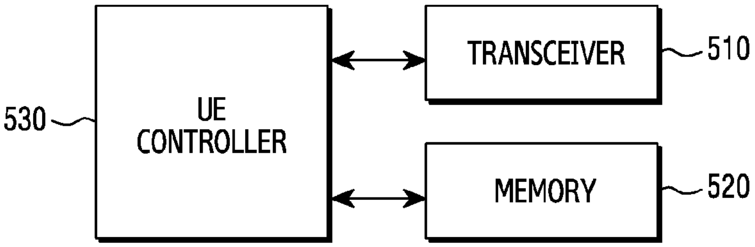
FIG. 5 illustrates a structure of a UE according to embodiments of the present disclosure.

FIG. 5 illustrates a structure of a UE according to embodiments of the present disclosure.

As illustrated in FIG. 5, the UE of the disclosure may include a transceiver 510, a memory 520, and a UE controller (or a processor 530). According to the above-described communication method of the UE, the UE controller 530, the transceiver 510, and the memory 520 may operate. However, the component elements of the UE are not limited to the above-descried example. For example, the UE may include more or fewer component elements than the above-described component elements. In addition, the UE controller 530, the transceiver 510, and the memory 520 may be embodied as a single chip.

The transceiver 510 is the collective name for the receiver of the UE and the transmitter of the UE, and may be capable of performing signal transmission or reception with a base station or a network entity. The signal transmitted or received by the base station may include control information and data. To this end, the transceiver 510 may include a radio frequency (RF) transmitter that up-converts and amplifies the frequency of a transmitted signal, an RF receiver that low-noise amplifies a received signal and down-converts the frequency of the signal, and the like. This is merely an example of the transceiver 510, and the component elements of the transceiver 510 are not limited to an RF transmitter and an RF receiver.

In addition, the transceiver 510 may include a wired or wireless transceiver, and may include various configurations for signal transmission or reception. In addition, the transceiver 510 may receive a signal via a wireless channel and may output the same to the UE controller 530, and may transmit a signal output from the UE controller 530 via a wireless channel. In addition, the transceiver 510 may receive a communication signal and may output the same to the UE controller 530, and may transmit a signal output from the UE controller 530 to a base station or a network entity via a wired or wireless network.

The memory 520 may store a program and data needed when the UE operates. In addition, the memory 520 may store control information or data included in a signal obtained by the UE. The memory 520 may be configured as a storage medium such as a ROM, a RAM, a hard disk, a CD-ROM, a DVD, and the like, or a combination of storage media.

The UE controller 530 may control a series of processes such that the UE operates according to the above-described embodiment of the disclosure. The UE controller 530 may include at least one processor. For example, the UE controller 530 may include a communication processor (CP) that performs control for communication, and an application processor (AP) that controls an upper layer such as an application program or the like.

Figure 6:
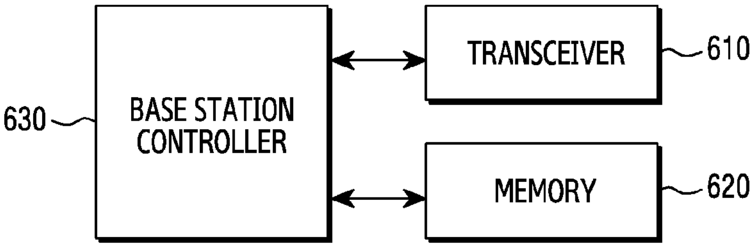
FIG. 6 illustrates a structure of a base station according to embodiments of the present disclosure.

FIG. 6 illustrates a structure of a base station according to embodiments of the present disclosure. The base station illustrated in FIG. 6 may correspond to a radio access node (RAN) that has been described with reference to FIG. 1 to FIG. 4.

As illustrated in FIG. 6, the base station of the disclosure may include a transceiver 610, a memory 620, and a base station controller 630 (or a processor). According to the above-described communication method of the base station, the base station controller 630, the transceiver 610, and the memory 620 may operate. However, the component elements of the base station are not limited to the above-descried example. For example, the base station may include more or fewer component elements than the above-described component elements. According to an embodiment, all functions of the base station of FIG. 6 may be embodied by being distributed in a CU and a DU. In this instance, the CU and the DU may respectively perform some functions performed by the base station of FIG. 6. In addition, the base station controller 630, the transceiver 610, and the memory 620 of FIG. 6 may be embodied as a single chip.

The transceiver 610 is the collective name for the receiver of the base station and the transmitter of the base station, and may be capable of performing signal transmission or reception with a UE and/or a network entity. The transmitted or received signal may include control information and data. To this end, the transceiver 610 may include an RF transmitter that up-converts and amplifies the frequency of a transmitted signal, an RF receiver that low-noise amplifies a received signal and down-converts the frequency of the signal, and the like. This is merely an example of the transceiver 610, and the component elements of the transceiver 610 are not limited to an RF transmitter and an RF receiver. In addition, the transceiver 610 may include a wired or wireless transceiver, and may include various configurations for signal transmission or reception.

In addition, the transceiver 610 may receive a signal via a communication channel (e.g., a wireless channel) and output the same to the base station controller 630, and may transmit a signal output from the base station controller 630 via a communication channel. In addition, the transceiver 610 may receive a communication signal and may output the same to a processor, and may transmit a signal output from the processor to a UE or a network entity via a wired or wireless network.

The memory 620 may store a program and data needed when the base station operates. In addition, the memory 620 may store control information or data included in a signal obtained by the base station. The memory 620 may be configured as a storage medium such as a ROM, a RAM, a hard disk, a CD-ROM, a DVD, and the like, or a combination of storage media.

The base station controller 630 may control a series of processes such that the base station operates according to the above-described embodiment of the disclosure. The controller 630 may include at least one processor. Methods stated in claims or specifications of the disclosure may be implemented by hardware, software, or a combination of hardware and software.

Figure 7:
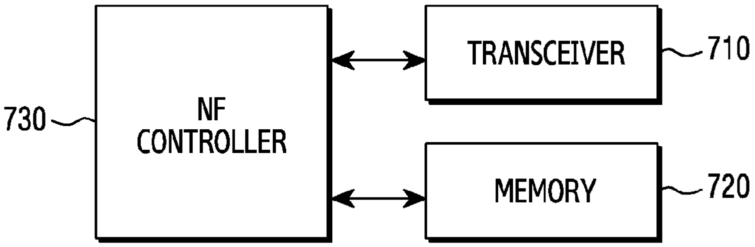
FIG. 7 illustrates a structure of a network function (or a network entity) according to embodiments of the present disclosure.

FIG. 7 illustrates a structure of a network function (or a network entity) according to embodiments of the present disclosure. A network function (or a network entity) illustrated in FIG. 7 may correspond to various functions or entities of a core network that has been described with reference to FIGS. 1 to 4.

As illustrated in FIG. 7, a network function (NF) (or a network entity) of the disclosure may include a transceiver 710, a memory 720, and an NF controller 730 (or a processor). According to a communication method of the above-described network function (or network entity), the NF controller 730, the transceiver 710, and the memory 720 of the network function (or network entity) may operate. However, the component elements of the network function (or network entity) are not limited to the above-descried example. For example, the network function (or network entity) may include more or fewer component elements than the above-described component elements.

The transceiver 710 may be the collective name of the receiver of the network function (or network entity) and the transmitter of the base station, and may perform signal transmission or reception with a UE, a base station, and/or another network function (or another network entity). In this instance, the transmitted or received signal may include control information and data. To this end, the transceiver 710 may communicate with nodes in a core network via a wired or wireless transceiver. This is merely an example of the transceiver 710, and the component elements of the transceiver 710 may include an RF transmitter to up-convert and amplify the frequency of a transmitted signal, an RF receiver to low-noise amplify a received signal and to down-convert a frequency, and the like, and may include various configurations to perform signal transmission or reception.

In addition, the transceiver 710 may receive a signal via a communication channel (e.g., a wireless channel or a channel of a core network) and output the same to the NF controller 730, and may transmit a signal output from the NF controller 730 via a communication channel. In addition, the transceiver 710 may receive a communication signal and may output the same to the NF controller 730, and may transmit a signal output from the NF controller 730 to a UE, a base station, or a network entity via a wired or wireless network.

The memory 720 may store a program and data needed when the network function (or network entity) operates. In addition, the memory 720 may store control information or data included in a signal obtained by the network function (or network entity). The memory 720 may be embodied as a storage medium such as a ROM, a RAM, a hard disk, a CD-ROM, a DVD, and the like, or a combination of storage media.

The NF controller 730 may control a series of processes in which the network function (or network entity) operates according to the above-described embodiment of the disclosure. The NF controller 730 may include at least one processor. Methods stated in claims or specifications of the disclosure may be implemented by hardware, software, or a combination of hardware and software.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Furthermore, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. Furthermore, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. It will be apparent that, for example, a part or all of some embodiments may be combined with a part or all of other one or more embodiments and these combinations also fall within embodiments provided in the disclosure. Therefore, the scope of the disclosure should not be defined as being limited to the embodiments, but should be defined by the appended claims and equivalents thereof.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first session management function (SMF) entity of a home public land mobile network (HPLMN) in a mobile communication system, the method comprising:

transmitting, to a policy control function (PCF) entity of the HPLMN, a first message for requesting an offloading policy for a visited public land mobile network (VPLMN), the first message including a serving network identifier of the VPLMN and information indicating that a protocol data unit (PDU) session of the VPLMN supports a home routed session breakout (HR-SBO); and receiving, from the PCF entity of the HPLMN, a second message including the offloading policy for the PDU session.

2. The method of claim 1, further comprising:

receiving, from a second SMF entity of the VPLMN, a third message for requesting a creation of the PDU session; and transmitting, to the second SMF entity of the VPLMN, a fourth message including the offloading policy for the PDU session.

3. The method of claim 2, further comprising:

transmitting, to a unified data management (UDM) entity, a fifth message for requesting subscription information of the PDU session; and receiving, from the UDM entity, a sixth message including the subscription information.

4. The method of claim 2, wherein the offloading policy for the PDU session is applied to a user plane function (UPF) entity of the VPLMN, and wherein the UPF entity is selected and configured as an uplink classifier (UL CL) or a branch point (BP) based on the offloading policy for the PDU session.

5. The method of claim 1, wherein the second message further includes information on a fully qualified domain name (FQDN) allowed for a local part of data network (DN) in the VPLMN, and information on an authorized aggregate maximum bit rate (AMBR) for the PDU session of the local part of the DN in the VPLMN.

6. A method performed by a policy control function (PCF) entity in a mobile communication system, the method comprising:

receiving, from a first session management function (SMF) entity of a home public land mobile network (HPLMN), a first message for requesting an offloading policy for a visited public land mobile network (VPLMN), the first message including a serving network identifier of the VPLMN and information indicating that a protocol data unit (PDU) session of the VPLMN supports a home routed session breakout (HR-SBO); and transmitting, to the first SMF entity of the HPLMN, a second message including the offloading policy for the PDU session.

7. The method of claim 6, wherein the offloading policy for the PDU session is transmitted from the first SMF entity of the HPLMN to a second SMF entity of the VPLMN.

8. The method of claim 7, wherein the offloading policy for the PDU session is based on subscription information in a unified data management (UDM) entity.

9. The method of claim 7, wherein the offloading policy for the PDU session is applied to a user plane function (UPF) entity of the VPLMN, and wherein the UPF entity is selected and configured as an uplink classifier (UL CL) or a branch point (BP) based on the offloading policy for the PDU session.

10. The method of claim 6, wherein the second message further includes information on a fully qualified domain name (FQDN) allowed for a local part of data network (DN) in the VPLMN, and information on an authorized aggregate maximum bit rate (AMBR) for the PDU session of the local part of the DN in the VPLMN.

11. A first session management function (SMF) entity of a home public land mobile network (HPLMN) in a mobile communication system, the first SMF entity comprising:

at least one processor; and at least one memory, communicatively coupled to the at least one processor, storing instructions executable by the at least one processor individually or in any combination to cause the first SMF entity to transmit, to a policy control function (PCF) entity of the HPLMN, a first message for requesting an offloading policy for a visited public land mobile network (VPLMN), the first message including a serving network identifier of the VPLMN and information indicating that a protocol data unit (PDU) session of the VPLMN supports a home routed session breakout (HR-SBO), and receive, from the PCF entity of the HPLMN, a second message including the offloading policy for the PDU session.

12. The first SMF entity of claim 11, wherein the instructions further cause the first SMF entity:

receive, from a second SMF entity of the VPLMN, a third message for requesting a creation of the PDU session, and transmit, to the second SMF entity of the VPLMN, a fourth message including the offloading policy for the PDU session.

13. The first SMF entity of claim 12, wherein the instructions further cause the first SMF entity to:

transmit, to a unified data management (UDM) entity, a fifth message for requesting subscription information of the PDU session, and receive, from the UDM entity, a sixth message including the subscription information.

14. The first SMF entity of claim 12, wherein the offloading policy for the PDU session is applied to a user plane function (UPF) entity of the VPLMN, and wherein the UPF entity is selected and configured as an uplink classifier (UL CL) or a branch point (BP) based on the offloading policy for the PDU session.

15. The first SMF entity of claim 11, wherein the second message further includes information on a fully qualified domain name (FQDN) allowed for a local part of data network (DN) in the VPLMN, and information on an authorized aggregate maximum bit rate (AMBR) for the PDU session of the local part of the DN in the VPLMN.

16. A policy control function (PCF) entity in a mobile communication system, the PCF entity comprising:

at least one processor; and at least one memory, communicatively coupled to the at least one processor, storing instructions executable by the at least one processor individually or in any combination to cause the PCF entity to receive, from a first session management function (SMF) entity of a home public land mobile network (HPLMN), a first message for requesting an offloading policy for a visited public land mobile network (VPLMN), the first message including a serving network identifier of the VPLMN and information indicating that a protocol data unit (PDU) session of the VPLMN supports a home routed session breakout (HR-SBO), and transmit, to the first SMF entity of the HPLMN, a second message including the offloading policy for the PDU session.

17. The PCF entity of claim 16, wherein the offloading policy for the PDU session is transmitted from the first SMF entity of the HPLMN to a second SMF entity of the VPLMN.

18. The PCF entity of claim 17, wherein the offloading policy for the PDU session is based on subscription information in a unified data management (UDM) entity.

19. The PCF entity of claim 17, wherein the offloading policy for the PDU session is applied to a user plane function (UPF) entity of the VPLMN, and wherein the UPF entity is selected and configured as an uplink classifier (UL CL) or a branch point (BP) based on the offloading policy for the PDU session.

20. The PCF entity of claim 19, wherein the second message further includes information on a fully qualified domain name (FQDN) allowed for a local part of data network (DN) in the VPLMN, and information on an authorized aggregate maximum bit rate (AMBR) for the PDU session of the local part of the DN in the VPLMN.

* * * * *